June 17, 1952  G. O. GUESMER ET AL  2,601,118
SLICED BREAD DISPENSING MACHINE
Filed Oct. 27, 1948  3 Sheets-Sheet 1
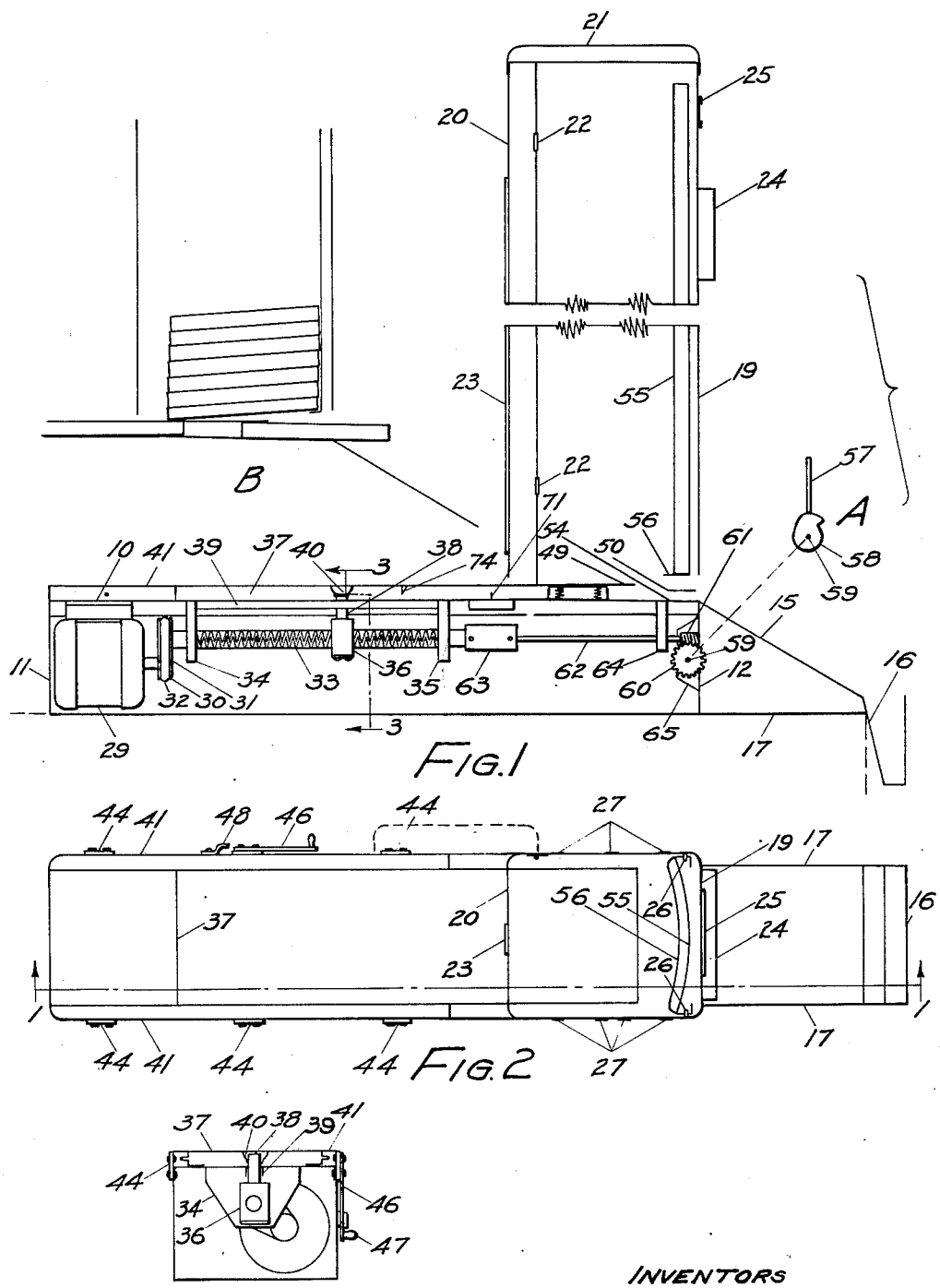
INVENTORS
GEORGE O. GUESMER
HARRY E. SCHULZE
BY Philip M. Stutrud
ATTORNEY

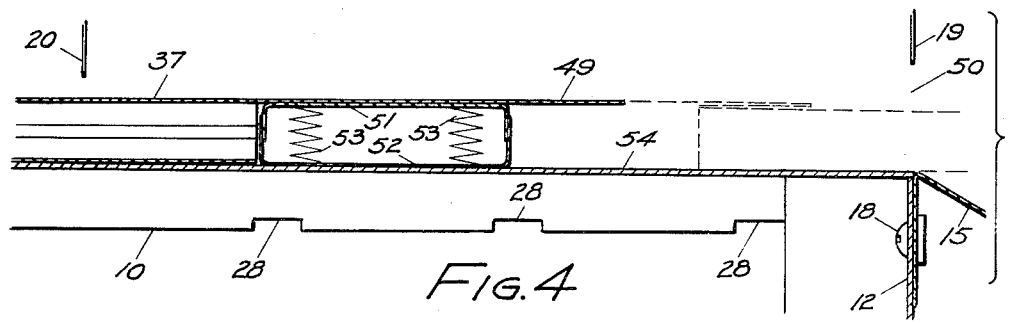
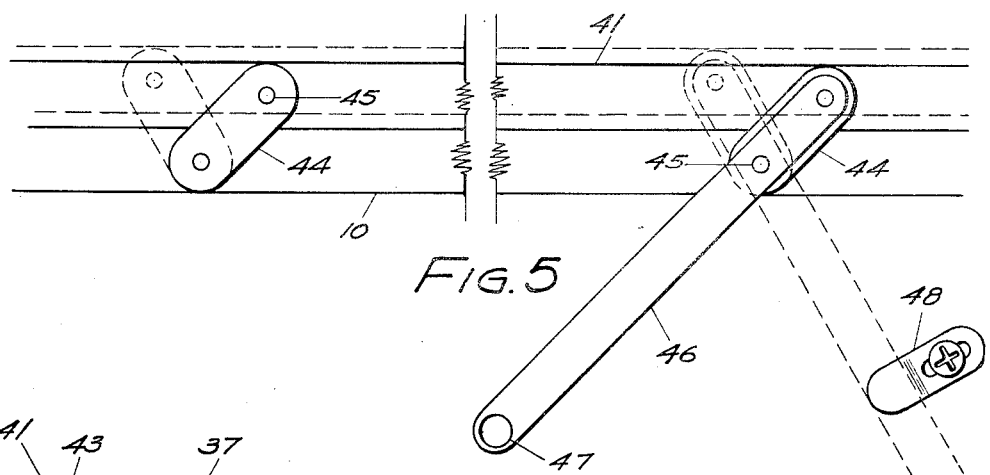
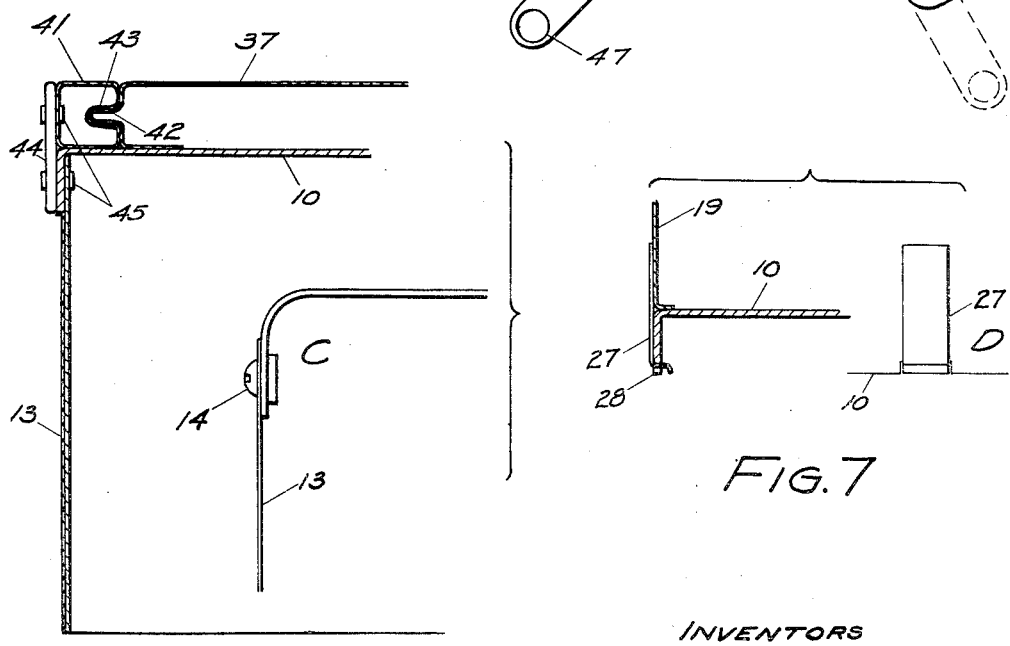

June 17, 1952  G. O. GUESMER ET AL  2,601,118
SLICED BREAD DISPENSING MACHINE

Filed Oct. 27, 1948  3 Sheets-Sheet 3

INVENTORS
GEORGE O. GUESMER
HARRY E. SCHULZE
BY Philip M. Stutrud
ATTORNEY

Patented June 17, 1952

2,601,118

UNITED STATES PATENT OFFICE 2,601,118

SLICED BREAD DISPENSING MACHINE

George O. Guesmer, Minneapolis, and Harry E. Schulze, Fairmont, Minn.

Application October 27, 1948, Serial No. 56,774

7 Claims. (Cl. 312—67)

This invention relates to sliced bread dispensing machines, and particularly to a machine that will dispense bread in a cafeteria, so that the unsanitary conditions, usually pertaining, will be eliminated.

Very little, if anything, has been accomplished in this field. It either requires the time of an attendant with tongs to dispense the bread, or the bread is within reach of the customer, who may pick it up and change his mind about what kind of bread he is going to eat. In either case, the bread is exposed to the drying action of the air and often the on-slaught of flies and blowing of dust.

An object of our invention is to provide a sliced bread dispensing machine, which will not require touching of the bread by any hand except that of the customer.

Another object is to provide such a machine, that will keep bread in good moist condition without drying out and will also keep the bread free from blowing of dirt and dust and from attack of flies.

Another object is to provide such a machine, that can be easily disassembled for cleaning and thus kept very sanitary.

Another object is to provide such a machine, that will operate automatically or semi-automatically at will of customer by push button control, to dispense several or a single slice of bread.

Another object is to provide such a machine, that may instantly be adjusted from one standard thickness of bread slice to another.

Another object is to provide such a machine at a reasonable cost, so that it will pay for itself in a relatively short time, by the saving of wages of an employee in addition to conserving counter space and increasing bread sales.

Other objects will be apparent from the description and appended claims.

For a full disclosure of our invention, reference is made to the description following and to the drawings, in which:

Fig. 1 is a sectional elevation view of the machine taken on line 1—1 of Fig. 2 and with supplementary detail views A and B.

Fig. 2 is a top plan view of the machine except that magazine cover is removed.

Fig. 3 is a sectional view on the line 3—3 of Fig. 1.

Fig. 4 is a large scale sectional view, principally of the adjustable slide end cooperating with inclined portion of base plate, taken on approximate longitudinal center line of the machine.

Fig. 5 is a large scale fragmentary side elevation view of linkage and leverage for setting machine for different slice thicknesses.

Fig. 6 is a large scale transverse sectional view of construction of slide, a guide, linkage and base plate, with a supplementary detail view C showing end support in plan view.

Fig. 7 is a large scale sectional view of one of spring clips for mounting magazine on base plate, with a supplementary detail view D showing front elevation view of clip.

Figure 8:
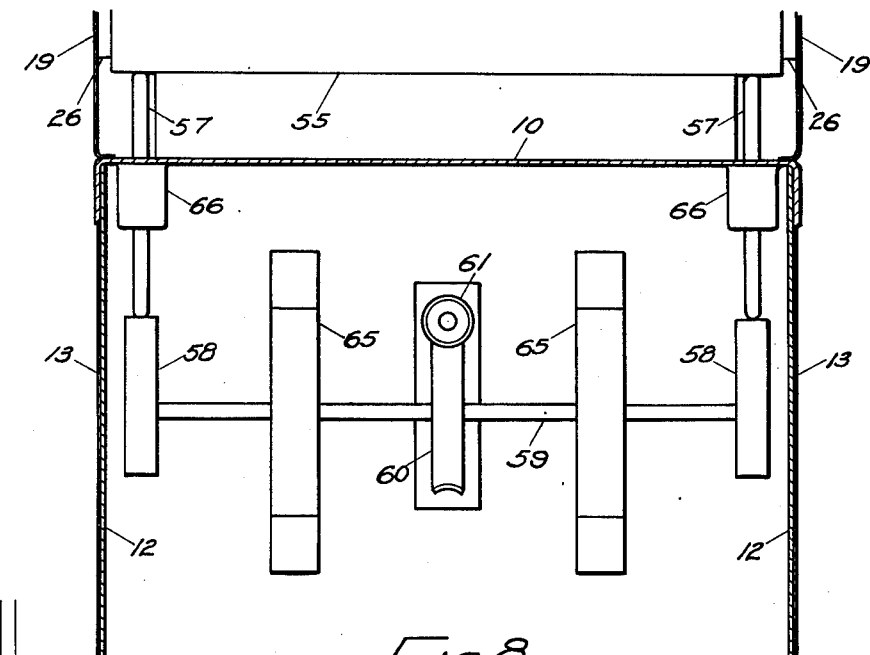
Fig. 8 is a large scale sectional view, taken at discharge end of machine, to show worm gearing, shafting, journal boxes, cams and lifter rods bushed through base plate.

Except for the larger scale views, sheet metal in section is for the purpose of clarity indicated by a single line.

In the selected embodiment of our invention, which is hereby disclosed, we provide a base plate 10 with end supports 11 and 12, all made of metal of substantial gage. The base plate has flanged edges on each side and is of uniform cross-section, except for slots for spring clips for magazine, holes for linkage pins and lifter pins, an inclined portion extending through magazine and a slot through which slide mechanism operates, all of which will be later described. The two end supports are similar, except that support 12 is of slightly lesser length due to sloping portion of base plate, has journal boxes attached to it and has a cut out portion to accommodate a worm gear, all of which will be later described. End supports are preferably secured to base plate by welding, and as stated, are of substantial thickness.

The balance of the construction, except for mechanical machine parts and some parts requiring transparency, may be made of lighter gage metal, and the parts with which bread comes in contact preferably of stainless steel or plated metal. We provide side enclosure plates 13 secured to end supports by bolts 14, which preferably have recessed heads. Nuts for the bolts are preferably tack welded to inner side of end supports. An inclined discharge chute 15, having a vertical pocket 16 and two side members 17, is detachably secured to end support 12 by slots, engaging under nuts of loosened bolts 18. A slice of bread discharged upon the chute assumes a position in the vertical pocket, so that it is easily picked up by the customer. Additional slices, which have been discharged upon the chute, will successively assume the position in the vertical pocket. A grid may be provided in the bottom of the pocket, so that crumbs will fall through, and a receptacle provided below the pocket for catching the crumbs. We provide a vertical magazine, which consists of a section 19 of U shaped cross section, a door 20 and a top cover 21, which fits down over the closed door and member 19 in a slip joint manner. The door, the U-shaped section and the top are all provided with rounded corners to render same unobstructive and also so same can be easily washed and kept clean. The door is provided with lift pin hinges 22, so same can be readily removed for washing. In opening, it also swings well in the clear, as indicated by dotted outline in Fig. 2. A vertical slot, with an insert of transparent material 23, is provided in the door, so that status of supply of bread in the magazine may be determined at a glance. In lieu of this, the entire door might be formed of a sheet of transparent plastic. The magazine would commonly be of capacity to hold two loaves of sliced bread, but can be arranged to suit any requirement. On the front of the magazine over the discharge chute 15, we mount a pocket 24, into which a bread sample is placed, and above the pocket a card holder 25, into which a card may be inserted, to also designate the kind of bread, which in the case of whole wheat or graham, may be necessary. Since the heels or crust ends of loaves must be discarded and converted into bread pudding or the like, for good operation of the machine as well as satisfaction to the customer, such ends may be inserted in the pocket 24. Oppositely disposed on the inside of the magazine near the front side thereof, we provide two guides 26 secured to the walls of the magazine. These are for a lifter device, which will be later described. To detachably secure the magazine to the base plate, we provide welded spring clips 27, which are unobstructive and which slip down over the flanged edge of the base plate and are locked in place in slots 28, provided in the base plate. These slots are so spaced, that the magazine can only be positioned on the base plate in correct manner. The flanged construction of the bottom of the magazine provides for solid support, when clips engage the base plate.

For operation of the machine, we preferably provide an electric motor 29, with pulleys 30 and 31 of required diameters and to accommodate a rubber belt 32 of round cross section. This drive is applied to a double helix reversing grooved shaft 33, positioned between journal boxes 34 and 35. On this shaft, a follower 36 transforms motion of rotation of shaft 33 into reciprocating motion of translation. This latter motion is imparted to a horizontally movable slide 37 by an extension 38 of the follower, moving in a slot 39 through the base plate. This extension fits into a collar 40 on the under side of the slide, which collar allows for vertical adjustment for different slice thicknesses, as will be later described. The slide 37 is preferably provided with a cross section, which is most clearly shown in Fig. 6. This slide engages a guide 41 positioned on each side of the base plate. A flanged portion 42 of the slide engages a channel portion 43 of the guide, so that the slide moves easily but truly in the guides. To provide for easy and instant adjustment of machine for a different thickness of bread slices, a linkage is provided by bars 44 and pivots 45. These bars and pivots secure the guides to the base plate. A lever 46 with a handle 47 is secured to one of the bars 44, providing easy means of adjustment by throwing from one position to the other. A stop 48, secured to side plate 13, determines the amount of the increase in height of guides, to accommodate a thicker slice of bread. This is determined by the rise resulting by change from a lesser to a greater vertical angle. It may be varied substantially, as long as the positions are safely off-center from a vertical position.

More than two thicknesses may be accommodated by making the stop 48 accordingly adjustable in a manner indicated by the drawing. With the machine set for the thicknesses of bread slices being dispensed, the forward extension 49 of the slide 37 cleaves the slice from the bottom of the stack of sliced bread, and the slide pushes it toward the discharge opening 50. The end of the slide is provided with telescopically engaging members 51 and 52, positioned by springs 53, so that a constant contact is maintained with the inclined portion 54 of the base plate. It will be apparent from Fig. 4, that a full thrust end is maintained against the edge of the slice of bread, while the extension 49, as indicated in dotted outline, is provided with more and more clearance of the slice of bread being discharged. A slice of soft bread is therefore not compressed laterally. To cooperate with the slide and fixed in relative operation thereto we provide a lifter 55 with a lip 56 engaging and raising the front side of a stack of bread slices, while the bottom slice is being discharged, as shown by supplementary view B of Fig. 1. The lifter 55 has a concave contour to fit the curved portion of bread slices, as shown by Fig. 2. As previously referred to, the lifter 55 operates in guides 26. It is actuated on each side by lifter rods 57, bushed through the base plate and moved by cams 58. These cams are fixed on a shaft 59 to which is keyed a worm gear 60, operated by a worm 61 on the end of a shaft 62, which is joined to shaft 33 by a coupling 63. The shaft 62 turns in a journal box 64, secured to the under side of the base plate, and the shaft 59 turns in two journal boxes 65, secured to inner sides of end support 12. Provision is made in a conventional manner to resist end thrust in both these shafts, so that proper engagement of worm and gear is maintained and so that cams are in line with lifter rods. Bushings 66, secured to underside of base plate, provide stability and direct movement of lifter rods 57, when moved by cams 58, as shown in Fig. 8. It will be observed, that the cam contour is such that the lifter is at its maximum height, when the slice of bread is discharged, and causes the lifter to fall, at the instant that the slide is thrown into reverse movement. It is found that a substantial speed of approximately 1350 R. P. M. must be imparted to the driven shaft, to efficiently accomplish the shuffling action on the bread slices and also discharge same at the required rate. If the motor speed, however, is too great to be reduced to the required figure by means of the pulleys indicated, it is easily accomplished by introducing a conventional compact speed reducer.

Figure 9:
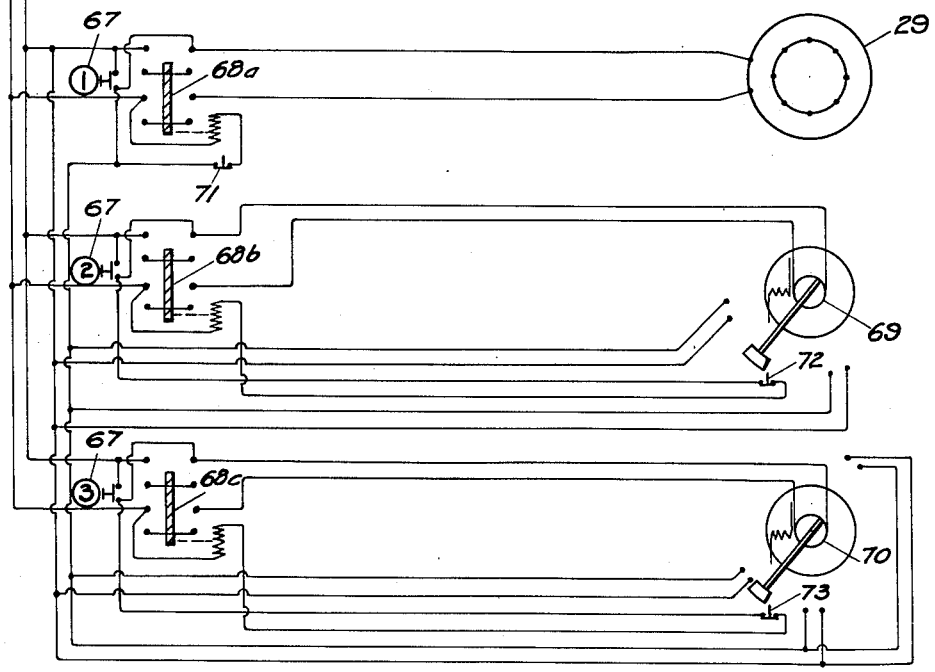
Fig. 9 is a diagram of the push button control apparatus to govern operation of the dispensing motor.

Our machine is operated by connection to the common alternating current single phase lighting circuit. To provide for automatic operation to dispense a plurality of slices at will of the customer, a control apparatus, as illustrated diagrammatically in Fig. 9, is provided. It is initiated by push buttons 67, marked 1, 2 and 3, denoting the number of slices of bread desired.

These push buttons are preferably on a mounting on the counter, set off side from the machine, and with the control apparatus in proper space under the counter. In lieu of the three push buttons, a radially moving lever, in three positions, can be provided to make the settings, with a single push button to start the machine. Controls, for a number in excess of three slices, can be provided, but it is believed, that a selective 1, 2 or 3 slice control will meet the needs. In sandwich shops, it may be desired to have only one push button, with an arrangement for constantly dispensing two slices at a time. The form of controls, disclosed by diagram of Fig. 9, consists of solenoid relays 68a, b and c, synchronous clock motors 69 and 70 with brushes and multiple contacts as required, and stop limit switches 71, 72 and 73, all of said elements joined by circuits as indicated. The contacts for the brushes of the synchronous clock motors are so spaced, that the interval of time required for machine to dispense a slice of bread, is represented between each pair of contacts. For semiautomatic or single slice dispensing, a trip 74 is provided on the slide to engage the stop switch 71. The cycle, for dispensing a single slice of bread, has been found to work out satisfactorily at three seconds. If two slices of bread are desired and the push button 2 is pressed to energize the solenoid relay 68b, the operation becomes automatic by means of the synchronous clock motor 69 and its brush and arrangement of contacts. This motor rotates clockwise, and the brush contacts the two pairs of points long enough to start the dispenser motor twice. The time interval around between these pairs of points has been found to work out satisfactorily at four seconds, and with an interval of one second on each side of the stop switch 72. This stop switch is a normally closed micro-switch, which opens with very light pressure of the brush arm, and the brush stops without making further contact ready for the next operation. A brush speed of 10 R. P. M. has been found satisfactory. If three slices of bread are desired and the push button 3 is pressed, the solenoid relay 68c and synchronous clock motor 70 are brought into action. In this case, three pairs of points are provided with a time interval of four seconds, and an interval of one second on each side of the stop switch 73. This is accordingly satisfactorily provided by a brush speed of 6 R. P. M. With circuits broken by the respective stop switches, the cores of the solenoid relays drop by gravity to neutral position, and the machine is ready to respond to the desire of the next customer. The automatic and semi-automatic operation described, may of course be accomplished in other ways, than that shown by diagram of Fig. 9.

From the foregoing it is apparent how our machine is constructed and in general how it operates and meets the needs. Although applied specifically to bread, it may be used to dispense other articles, requiring sanitary keeping and dispensing, so articles are only subject to touch by the customer. The novel arrangement and co-operation of lifter with slide, is what makes possible the handling of soft fresh, bread, which is kept in such condition by the magazine. Bread that is firm and not extremely soft and fresh, is of course more easily handled, and would not require such refinement and close co-operation of lifter and slide. With the lifter and slide arrangement, are combined, a discharge chute positioning the slices vertically for easy access, an instantly made adjustment for slice thickness, a novel driving mechanism, automatic or semi-automatic push button control and unobstructive construction, which is easily disassembled and assembled in connection with cleaning. Although the drive described seems very preferable, the machine may of course be driven by pinions and racks, by pins and yokes and perhaps by solenoids, any one of which would be subject to push button control, to dispense slices of bread. It will be noted, that driving mechanism is completely enclosed, so there is perfect safety afforded to cafeteria employees and customers. It is of course not limited to use in cafeterias, as the machine will serve well in short order and sandwich shops, where it is highly desirable to have slices of bread instantly and readily available, while supply is kept in a clean and sanitary manner, and without drying out. As previously explained, controls for machine may be arranged, so that by a single push on a button, two slices are dispensed for such sandwich shop service. It is apparent, that the machine can readily be made to specification for any special thickness of bread. To handle Vienna rolls or some of the more slender loaves of rye bread, a wire or metal adaptor can be provided to fit within the magazine, so that the loaf is properly positioned with respect to the lifter and slide. The common thickness of sliced bread is $\frac{9}{16}''$, and for that known as "thin slice," the thickness is $\frac{7}{16}''$. These two thicknesses are directly accommodated by the two settings of linkage illustrated in Fig. 5. In the case of some rye bread and graham, which is cut to $\frac{1}{2}''$, an adjustment of the stop member 48, as previously explained, takes care of the variation. It will ordinarily be desirable to have a service man make adjustment for this variation in thickness, so that cafeteria attendants only make the change from one standard thickness to another, by throwing the lever 46.

To fill the magazine of the machine, the wrapper is opened at one end of the loaf and the crust end removed, the loaf is then inverted and the other crust end removed. The bread may then be shaken out of the wrapper vertically into the magazine, or the wrapper slashed lengthwise and contents pushed into the magazine through the door. It is apparent, that the magazine is readily filled without the bread being touched by the hands. By making selection of push button for number of slices as previously described, the machine is put into operation. The slide pushes the bottom slice out of the magazine freely, by reason of clearance provided by slight downward slope of the base plate and by lip on lifter raising front end of stack of other bread slices. The lifter and front end of stack of bread slices then drops, due to action of lifter cams, to a position on top of the slide. With the backward movement of the slide, the stack of bread by its frictional contact with the slide is released from the lip of the lifter, and when the slide is fully back free from the stack of bread as restrained by the magazine, another slice is positioned in front of the slide. When the slide again moves forward cleaving and pushing the bottom slice, the lip engages the under side of the second slice upward and raises the stack of bread. The relative operation is such, that when the forward movement of the slide is sufficient to place the stack of bread on the lifter lip, the cam starts to raise the lifter again, providing clearance, while bottom slice continues to be pushed out. The forward extension of the slide provides cleavage between the slices, and the stack is suspended between the lip of the lifter and the top sliding surface of the slide. The operation of the machine is of course further facilitated, by the spring loaded telescopically engaging members of the slide; all the while closely following the surface of the base plate; and by the vertical pocket at the bottom of the inclined chute, positioning bread slices, so same may be easily picked up.

While we have shown and described a preferred form of our invention, it is obvious that many changes, which are within the scope of our invention, will be apparent to those skilled in the art. We therefore desire to be limited only by the scope of the appended claims.

What we claim is:

1. In a machine of the class described, in combination, a base plate with supporting structure and having oppositely disposed guides on each side and for a substantial length thereof a horizontal slide adapted to be engaged by and move in said guides, said guides provided with leverage means for vertical adjustment thereof for different bread slice thicknesses, said base plate having a slight downward incline at one end and spanned by a vertical magazine, said magazine being provided with a door and a slip joint cover engaging said magazine and said door when closed, together with means for releasably engaging edges of said base plate, said downward incline of said base plate increasing the clearance of said horizontal slide for facilitating the discharge of slices of bread, said horizontal slide having a range of movement to move through and expel slices of bread from the bottom of said magazine and having a forward extension for cleavage between slices, and a spring loaded vertically adjustable thrust end under and rearwardly of said extension to accommodate settings for different slice thicknesses and any variation in surface of base plate in a self-acting manner, said magazine having guides interiorly thereof over the end of said base plate, a vertical lifter adapted to move in said guides and together with said horizontal slide responding to a power driven mechanism, said lifter having a face shaped to accommodate the bread contour so that slices register, said lifter having a horizontally extending lip into the magazine in support of the stack of bread slices to provide clearance with the slice above in pushing out the bottom slice of bread, said driving mechanism comprising a follower on a double helix reversing grooved horizontal shaft with an extension through a slot in said base plate, for attachment to said slide, a worm on a second shaft in line with and coupled to said first shaft and driving a worm gear on a cross shaft, lifting cams keyed to each end of said cross shaft provided with a contour to act on lifter rods and to lift and lower said lifter as required to co-operate with said slide, in providing clearance for the slide to push out the bottom slice and then the slide releasing the stack of bread from the lifter, so as to position another slice in front of the slide to repeat the operation, said mechanism being driven by a source of power at the required speed and with controls for self acting of the machine to dispense a single slice or a plurality of slices according to the desires of the customer, as provided for by the setting of the controls.

2. In a machine of the class described, in combination, a base plate with supporting structure and having guides in the sides thereof, a vertical magazine positioned at one end of said base plate and having vertical guides on the interior over the end of said base plate, a horizontal slide adapted to move in the guides of said base plate, a vertical lifter adapted to move in the guides of said magazine and a power driven mechanism with controls to actuate said slide and said lifter, said base plate having a slight downward incline for a length extending through said magazine to increase clearance of said horizontal slide for facilitating the discharge of slices of bread, said vertical magazine being provided with a door, a slip joint cover engaging said magazine and said door when closed and means for engaging edges of said base plate, said guides of said base plate having leverage means for vertical adjustment thereof for different bread slice thicknesses, said horizontal slide having a forward extension for cleavage between slices of bread, and under and rearwardly of said extension a vertically spring loaded thrust end to follow top of the base plate and accommodate setting of slide guides for different bread slice thicknesses, said vertical lifter responding to said power driven mechanism and having a face shaped to accommodate the bread contour so that slices register, said lifter having a horizontally extending lip into the magazine in support of the stack of slices to provide clearance with the slice above in pushing out the bottom slice of bread, said driving mechanism comprising a follower on a double helix reversing grooved horizontal shaft with an extension through a slot in said base plate, for attachment to said slide, a worm on a second shaft in line with and coupled to said first shaft and driving a worm gear on a cross shaft, lifting cams keyed to each end of said cross shaft and provided with a contour to act on lifter rods and to lift and lower said lifter as required to co-operate with said slide, in providing clearance for the slide to push out the bottom slice and then the slide releasing the stack of bread from the lifter, so as to position another slice in front of the slide to repeat the operation, said mechanism being driven by a source of power at the required speed and with controls for self acting of the machine to dispense a single slice or a plurality of slices, according to the desires of the customer as provided for by the setting of the controls.

3. In a machine of the class described, in combination, a base plate with supporting structure, a vertical magazine positioned at one end of said base plate, said base plate having a slight downward incline from horizontal toward its end for the length occupied by said magazine, said magazine being provided with a door and a slip joint cover engaging said magazine and said door when closed, together with means for releasably engaging edges of said base plate, flanged guides within said magazine to accommodate a lifter near the end of said base plate, said lifter having a lip at the bottom thereof extending inwardly of said magazine, cam means for vertical operation of said lifter, slide means in connection with said base plate arranged to be activated horizontally, said lifter providing clearance with the slice above as said slide means cleaves and pushes out the bottom slice of bread, said slide means in its reverse movement by frictional contact releasing the stack of bread from the lip of the lifter and when fully back positioning another slice in front of said slide means to repeat the operation, said operation being facilitated by said downward incline of said base plate providing increasing clearance, a driving mechanism arranged for relative vertical operation of said lifter and horizontal operation of said slide means of required speed and magnitude, together with controls for repeating the operation.

4. In a machine of the class described, in combination, a base plate with supporting structure and having guides at the sides thereof, a vertical magazine positioned at one end of said base plate and having a pair of vertical guides interiorly thereof and over the end of said base plate, a horizontal slide adapted to move in the guides of said base plate, lifter means adapted to move in the guides of said magazine and a power driven mechanism with controls to actuate said slide and said lifter, said base plate having a slight incline co-extensive with said magazine and sloping down to the end thereof to facilitate action of the slide in discharging a slice of bread, said vertical magazine being provided with a door and a top cover and means for releasably engaging edges of said base plate, said guides of said base plate having leverage means for vertical adjustment thereof for different slice thicknesses, said horizontal slide having a forward extension for cleavage between slices of bread and under and rearwardly of said extension a vertically spring loaded thrust end to closely follow the top of the base plate regardless of setting of slide guides for variation in slice thicknesses, said lifter means located within said magazine being actuated vertically by said driving mechanism and by gravity and in fixed operative relation to horizontal movements of said slide, so that clearance of the slice above in pushing out a slice of bread is provided and the stack of bread is released from said lifter means by said slide, so as to position another slice in front of the slide to repeat the operation, said power driven mechanism arranged for relative vertical operation of said lifter means and horizontal operation of said slide of required speed and magnitude, to dispense a single slice or a plurality of slices, as governed by the setting of the controls.

5. In a machine of the class described, in combination, a base plate with oppositely disposed guides at the edges on the top side thereof and extending over the major portion of the length thereof adapted to engage a horizontal slide, said guides being provided with linkage and leverage for vertical adjustment thereof for different bread slice thicknesses, said base plate having a true flat top surface except for a slight downward incline at one end thereof, a vertical magazine of a width to substantially span said incline and provided with a hinged door opening toward the opposite end of said base plate, to facilitate transferring of sliced bread from a paper wrapper into the magazine without hands touching the bread, guides on the inside of the magazine over the end of said base plate to accommodate a lifter, said slide operating between the guides of said base plate being subject to forward and backward movement of a driving means to dispense slices of bread from the bottom of said magazine, and being provided with a spring loaded vertically adjustable member to adapt itself to said slight incline and to co-operate with the thrust end of said slide to provide close contact with the top of the base plate under all conditions and settings for different slice thicknesses, said lifter being subject to upward and downward movement by a cam and rod arrangement actuated by said driving means, and having a lip at the bottom to engage the under side of respective slices of bread and arranged by relative movements of slide and lifter to provide clearance with slice above when slide pushes out a slice of bread, and then the slide releasing the stack of bread from the lifter so as to position another slice in front of the slide to repeat the operation, said driving means providing for motion of rotation being transformed to reciprocating motion of translation horizontally and vertically, so that said slide moves back and forth and said lifter moves up and down with such relative motion one to the other, so that easily compressible units like slices of fresh bread can be rapidly dispensed without jamming.

6. In a machine of the class described, in combination, a base plate, with guides at the sides thereof end supports for said base plate, a vertical magazine positioned at one end of said base plate and having vertical guides on the inside thereof, a horizontal slide adapted to move in the guides of said base plate, a vertical lifter adapted to move in the guides in said magazine and a driving mechanism with a source of power to actuate said slide and said lifter respectively horizontally and vertically, said base plate having a slight downward incline co-extensive in length with said magazine to provide greater clearance and facilitate action of slide in discharging a slice of bread, said vertical magazine having a plurality of clips releasably engaging said base plate, whereby said magazine may be quickly and easily dismantled for thorough cleaning, said guides of said base plate having linkage and leverage for vertical adjustment thereof for different slice thicknesses, said horizontal slide having a forward extension for cleavage between slices and having under and rearwardly of said extension a vertically spring loaded telescoping thrust end to at all times and for different settings for slice thickness closely fit the top surface of said base plate, said vertical lifter positioned between the guides in said magazine having a lifter rod engaging the bottom edge on each side thereof and passing through bores in said base plate for engagement with said driving mechanism, said lifter having a concave face toward the inside of the magazine to accommodate the bread contour so that slices register and being provided at the bottom with a lip to support stack of bread, while the bottom slice is being pushed out and until stack of bread is removed from the lip by frictional contact with the slide in its backward movement, when the operation is again repeated.

7. In a sliced bread dispensing machine, the combination of a horizontally actuated slide on a base plate and a vertically actuated lifter inside of a magazine power driven mechanism with controls actuating said slide and said lifter, said slide having guides with linkage connection to the base plate arranged for vertical adjustment of the guides and the slide for different slice thicknesses, said slide having an extension forward adapted for cleavage between bread slices and under said extension a self adjustable thrust end keeping a constant full contacting surface forward closely following said base plate regardless of slice thickness, said base plate having a slight declination for clearance for pushing out bread slices, said lifter having a horizontal lip at the bottom thereof toward the interior of the magazine adapted to engage the under side of a stack of bread slices, said lifter having a concave face to accommodate the contour of the bread and keep stack of bread slices substantially in register position, said slide and said lifter in their respective horizontal and vertical movements being so correlated that the stack of bread is supported on the lip of the lifter; while the bottom slice is being pushed out and until removed from the lip by frictional contact with the slide in its backward movement; which then positions another slice in front of the slide and the operation is again repeated.

GEORGE O. GUESMER.
HARRY E. SCHULZE.

REFERENCES CITED

The following references are of record in the file of this patent:

FOREIGN PATENTS

| Number | Country | Date |
|---|---|---|
| 22,729 | Great Britain | Oct. 26, 1908 |
| 59,522 | Austria | June 10, 1913 |